United States Patent
Foran et al.

(10) Patent No.: US 7,079,673 B2
(45) Date of Patent: Jul. 18, 2006

(54) SYSTEMS FOR ANALYZING MICROTISSUE ARRAYS

(75) Inventors: David J. Foran, Short Hills, NJ (US); Wenjin Chen, Piscataway, NJ (US)

(73) Assignee: University of Medicine & Denistry of NJ, Newark, NJ (US)

( * ) Notice: Subject to any disclaimer, the term of this patent is extended or adjusted under 35 U.S.C. 154(b) by 572 days.

(21) Appl. No.: 10/072,470

(22) Filed: Feb. 5, 2002

(65) Prior Publication Data

US 2003/0147552 A1   Aug. 7, 2003

(51) Int. Cl.
  *G06K 9/00*   (2006.01)
(52) U.S. Cl. ...................................... 382/128; 382/209
(58) Field of Classification Search ................. 382/128
  See application file for complete search history.

(56) References Cited

U.S. PATENT DOCUMENTS

| | | | |
|---|---|---|---|
| 4,513,438 A | | 4/1985 | Graham et al. |
| 4,705,756 A | | 11/1987 | Spillert et al. |
| 5,016,283 A | | 5/1991 | Bacus et al. |
| 5,616,905 A | * | 4/1997 | Sugiyama ............... 235/456 |
| 5,733,739 A | | 3/1998 | Zakim et al. |
| 5,793,969 A | | 8/1998 | Kamentsky et al. |
| 5,930,461 A | | 7/1999 | Bernstein et al. |
| 5,991,028 A | | 11/1999 | Cabib et al. |
| 6,007,996 A | | 12/1999 | McNamara et al. |
| 6,078,681 A | | 6/2000 | Silver |
| 6,103,466 A | | 8/2000 | Grobet et al. |
| 6,103,518 A | | 8/2000 | Leighton |
| 6,121,960 A | * | 9/2000 | Carroll et al. ............ 345/173 |
| 6,148,096 A | | 11/2000 | Pressman et al. |
| 6,226,392 B1 | | 5/2001 | Bacus et al. |
| 6,272,235 B1 | | 8/2001 | Bacus et al. |
| 6,633,659 B1 | * | 10/2003 | Zhou ...................... 382/129 |
| 6,658,287 B1 | | 12/2003 | Litt et al. |
| 6,692,916 B1 | | 2/2004 | Bevilacqua et al. |
| 6,711,283 B1 | * | 3/2004 | Soenksen ................ 382/133 |

FOREIGN PATENT DOCUMENTS

| | | |
|---|---|---|
| WO | WO 93/14600 | 7/1993 |
| WO | WO 96/07161 | 3/1996 |

(Continued)

OTHER PUBLICATIONS

Baumann, I. et al. Image Analysis Detects Lineage-Specific Morphologic Markers in Leukemic Blast Cells. Am. J. Clin. Pathol. 105, 23-30 (Jan. 1996).

(Continued)

*Primary Examiner*—Brian Werner
*Assistant Examiner*—Christopher Lavin
(74) *Attorney, Agent, or Firm*—Watov & Kipnes, P.C.; Kenneth Watov

(57) ABSTRACT

The systems described herein autonomously image, analyze, and store date for samples in a tissue microarray. The system may include a tissue microarray, a robotic microscope, and an imaging workstation that executes software to automatically control operation of the microscope to capture images from the microarray and analyze image results. A low magnification may be used to register samples within the microarray and obtain coordinates for each tissue specimen. Progressively higher magnifications may be used to analyze images of each registered specimen. Images and quantitative data from the images may then be stored in a relational database for subsequent review. The system may be local, or may be Web-based for distributed control and sharing of results.

28 Claims, 4 Drawing Sheets

FOREIGN PATENT DOCUMENTS

| WO | WO 99/30264 | 6/1999 |
|----|----|----|
| WO | WO 99/44063 | 9/1999 |

OTHER PUBLICATIONS

Bennett, J.M., et al., "Proposals for the Classification of the Acute Leukaemias", Br. J. Haematol., vol. 33, pp. 451-458 (1976).

Cabral, J.E. Jr. & Kim, Y. Multimedia Systems for Telemedicine and Their Communications Requirements. *IEEE Communications Magazine* 34, 20-27 (Jul. 1, 1996).

Chan, J. K. C., et al., "A Revised European-American Classification of Lymphoid Neoplasms Proposed by the International Lymphoma Study Group," Amer. J. Clin. Pathol., vol. 103:(5), pp. 543-560 (1995).

Comaniciu, D. and Meer, P., "Distribution Free Decomposition of Multivariate Data," Pattern Anal. Applicat., vol. 2, pp. 22-30 (1999).

Dryden, I.L., and Mardia, K.V., Statistical Shape Analysis, West Sussex, U.K.: Wiley, pp. 251-278 (1998).

Garcia-Conde, J. and Cabanillas, F., "Mantle Cell Lymphoma: A Lymphoproliferative Disorder Associate with Aberrant Function of the Cell Cycle," Leukemia, vol. 10:(S2), pp. :S78-S83 (1996).

Geisler, C. H., et al., "Prognostic Importance of Flow Cytomeric Immunophenotyping of 540 Consecutive Patients with B-Cell Chronic Lymphocytic Leukemia," Blood, vol. 78:(7), pp. 1795-1802 (1991).

Genesereth M., and Nilson, N., Logical Foundations of Artificial Intelligence, Palo Alto, CA: Morgan Kaufman., pp. 19-45 (1988).

Grimes, G.J., "Remote Microscopy for Hi-Res Real-Time interactive pathology," Advanced Imaging., vol. 12:7, pp. 12-16 (1998).

Groshong, B.R. Estimating Simple Closed Contours in Images. *Proc. Ann. Symposium Comp. Based Med. Systems* 5, 35-43 (Jun. 14, 1992).

Harms, H., et al., "Segmentation of Stained Blood Cell Images Measured at High Scanning Density with High Magnification and High Numerical Aperture Optics," Cytometry, vol. 7, pp. 522-531 (1986).

Head, D. R., et al., "Reproducibility of the French-American-British Classification of Acute Leukemia: The Southwest Oncology Group Experience," Amer. J. Hematol., vol. 18, pp. 47-57 (1985).

Hu, M. K., et al., "Visual Pattern Recognition by Moment Invariants," IRE Trans. Inform. Theory Inform. Technol., vol. 8, pp. 179-187 (1962).

Kauppinen, H., et al., "An Experimental Comparison of Autoregressive and Fourier-Based Descriptors in 2D Shape Classification," IEEE Trans. Pattern Anal. Machine Intell., vol. 17(2), pp. 201-207 (1995).

Kendall, D.G., "A Survey of the Statistical Theory of Shape," Statistical Science, vol. 4(2), pp. 87-120 (1989).

Khotanzad, A., and Hong, Y. H., "Invariant Image Recognition by Zernike Moments," IEEE Trans. Pattern Anal. Machine Intell., vol. 12(5), pp. 489-497 (1990).

Khotanzad, A., and Hong, Y. H., "Rotation Invariant Image Recognition Using Features Selected Via a Systematic Method", Pattern Recognit., vol. 23:10, pp. 1089-1101 (1990).

Kilo, M. N., and Dorfman, D. M., "The Utility of Flow Cytometric Immunophenotypic Analysis in the Distinction of Small Lymphocytic Lymphoma/Chronic Lymphocytic Leukemia from Mantle Cell Lymphoma," Amer. J. Clin. Pathol., vol. 105, pp. 451-457 (1996).

Kuhl, F., P and Giardina, C.R., "Elliptic Fourier Features of a Closed Contour," Computer Graph. Image Process., vol. 18, pp. 236-258 (1982).

Mao, J. and Jain, A.K., "Texture Classification Segmentation Using Multiresolution Simultaneous Autoregressive Models," Pattern Recognit., vol. 25(2), pp. 173-188 (1992).

Rozman, C., and Montserrat, E., "Chronic Lymphocytic Leukemia", N.E.J.M., vol. 333:(16), pp. 1052-1057 (1995).

Vadlamudi, G., et al., "Leukemic Phase of Mantle Cell Lymphoma Two Case Reports and Review of the Literature", Arch. Pathol. Lab. Med., vol. 120, pp. 35-40 (1996).

Yatabe, Y, et al., "Clinicopathologic Study of PRAD1/Cyclin D1 Overexpressing Lymphoma with Special Reference to Mantle Cell Lymphoma", Amer. J. Surg. Pathol., vol. 20:(9), pp. 1110-1122 (1996).

Zink, S., and Jaffe, C. C., "Medical Imaging Databases, A National Institutes of Health Workshop," Investigative Radiol., vol. 28:(4), pp. 366-372 (1993).

\* cited by examiner

SYSTEMS FOR ANALYZING MICROTISSUE ARRAYS

BACKGROUND OF THE INVENTION

Tissue microarrays are a method of harvesting small disks of tissue from a range of standard histologic sections and arranging them on a recipient paraffin block such that hundreds or thousands of disks can be analyzed simultaneously. This technique allows maximization of tissue resources by analysis of small core biopsies of blocks, rather than complete sections. A carefully planned array of tissues can be constructed with cases from pathology tissue block archives, such that a 20-year survival analysis can be performed on a cohort of 600 or more patients by use of only a few microliters of antibody.

Tissue microarray technology has numerous advantages in addition to tissue amplification. For example, each specimen is treated in an identical manner. Like conventional formalin-fixed paraffin embedded material, tissue microarrays are amenable to a wide variety of techniques, including histochemical stains, immunologic stains with either chromogenic or fluorescent visualization, in situ hybridization (including messenger RNA in situ hybridization and fluorescence in situ hybridization) and even microdissection techniques. For each of these protocols conventional sections can have substantial slide-to-slide variability associated with processing 300 slides (e.g. 20 batch of 15 slides). By contrast, the tissue microarrays allow an entire cohort to be analyzed on a single slide. Thus, reagent concentrations are identical for each case, as are incubation times and temperatures and wash conditions. Antigen retrieval can be another significant variable in conventional sections, which is mitigated by the identical treatment of specimens in a microarray. As a further advantage, only a few microliters of reagent may be required to analyze an entire cohort in a microarray. This advantage raises the possibility of using tissue microarrays in certain screening procedures, such as hybridoma screening, where the protocol is not amenable to the use of conventional sections.

Currently, the primary method used to evaluate microarrays involves manual review of hundreds of tissue microarray ("TMA") cores under a microscope, while subjectively evaluating and scoring the signal at each location. An alternate, but less utilized approach is to sequentially digitize specimens for subsequent assessment. Both procedures involve manually and systematically reviewing the TMA sample under the microscope, which is a slow, tedious process, and which is especially error-prone because it is easy to loose track of a current array while navigating among the regularly arranged specimens. This is especially true at higher (e.g. 20x) magnifications.

Tissue microarrays also present some special problems such as heterogeneity of tissue sections, sub-cellular localization of staining, and background signal. Depending on the type of tumor or tissue section analyzed, the area of interest may represent nearly the entire disk or only a small percentage thereof. For example, a pancreatic carcinoma or lobular carcinoma of the breast with substantial desmoplastic response may show stromal tissue representing a large percentage of the total area of the disk. If the goal of the assay is to determine epithelial cell expression of a given marker, a protocol must be used that evaluates only that region of the disk. The protocol must not only be able to select the region of interest but also normalize it so that the expression level read from any given disk can be compared with that of other disks. Sub-cellular localization presents a host of additional challenges when comparing nuclear or membranous stainings which are quite different from those in total cytoplasmic staining.

There remains a need for a systematic approach to collecting, analyzing, and storing data from tissue microarrays.

SUMMARY OF THE INVENTION

The systems described herein autonomously image, analyze, and store data for samples in a tissue microarray. The system may include a tissue microarray, a robotic microscope, and an imaging workstation that executes software to automatically control operation of the microscope to capture images from the microarray and analyze image results. A low magnification may be used to register samples within the microarray and obtain coordinates for each tissue specimen. Progressively higher magnifications may be used to analyze images of each registered specimen. Images and quantitative data from the images may then be stored in a relational database for subsequent review. The system may be local, or may be Web-based for distributed control and sharing of results.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF CERTAIN EMBODIMENTS OF THE INVENTION

To provide an overall understanding of the invention, certain illustrative embodiments will now be described, including a system for automated analysis of a tissue microarray. However, it will be understood that the methods and systems described herein can be suitably adapted to any environment where a number of approximately regularly spaced specimens are to be visually inspected in some systematic fashion. For example, the systems and methods are applicable to a wide range of biological specimen images, and in particular to analysis or diagnosis involving cellular, or other microscopic, visual data. These and other applications of the systems described herein are intended to fall within the scope of the invention.

Figure 1:
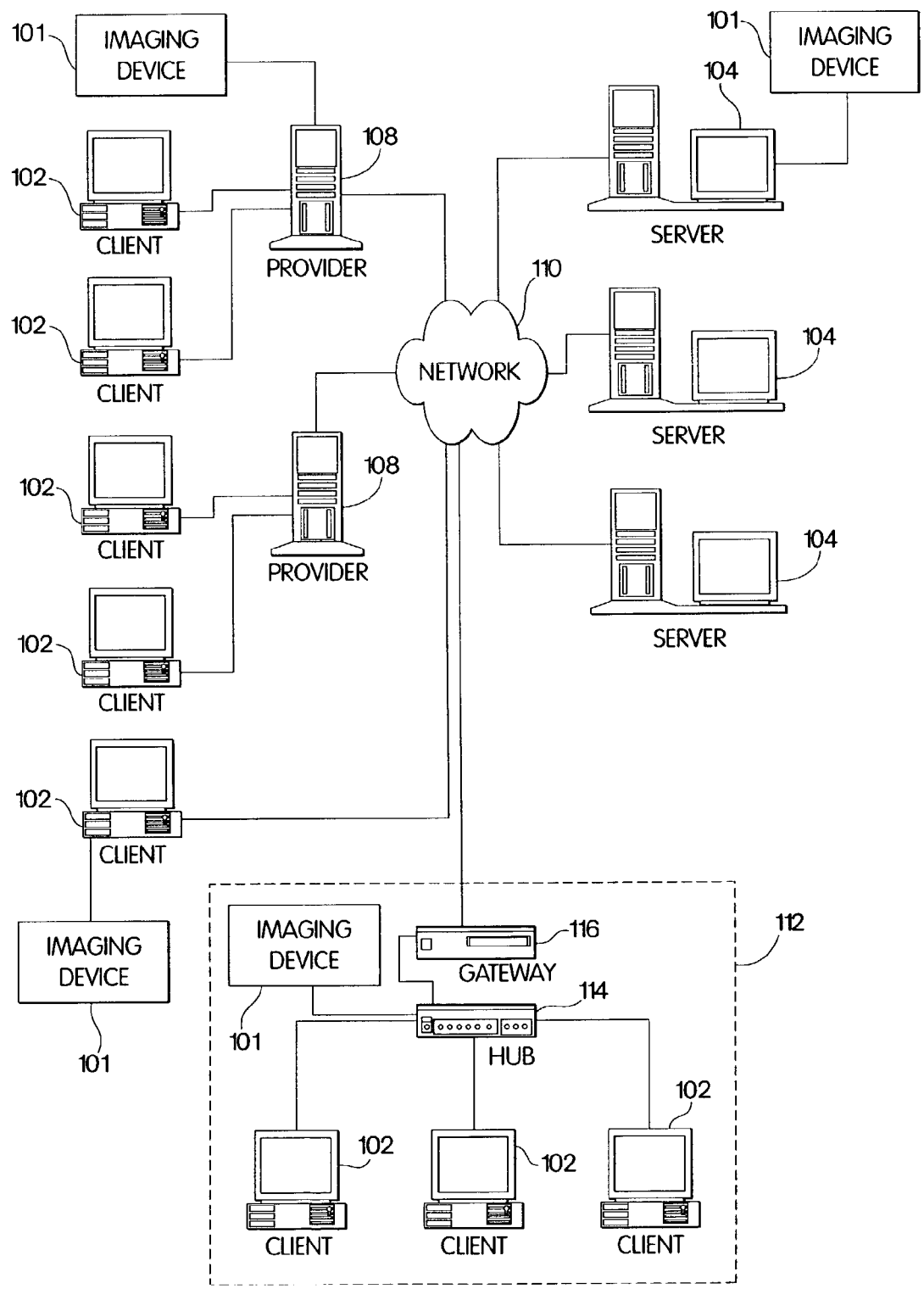
FIG. 1 shows a schematic diagram of the entities involved in an embodiment of a method and system disclosed herein.

FIG. 1 shows a schematic diagram of the entities involved in an embodiment of a method and system disclosed herein. In a system 100, one or more imaging devices 101, a plurality of clients 102, servers 104, and providers 108 are connected via an internetwork 110. It should be understood that any number of clients 102, servers 104, and providers 108 could participate in such a system 100. The system may further include one or more local area networks ("LAN") 112 interconnecting clients 102 through a hub 114 (in, for example, a peer network such as Ethernet) or a local area network server 114 (in, for example, a client-server network). The LAN 112 may be connected to the internetwork 110 through a gateway 116, which provides security to the LAN 112 and ensures operating compatibility between the LAN 112 and the internetwork 110. Any data network may be used as the internetwork 110 and the LAN 112.

In one embodiment, the internetwork 110 is the Internet, and the World Wide Web provides a system for interconnecting imaging devices 101, clients 102 and servers 104 through the Internet 110. The internetwork 110 may include a cable network, a wireless network, and any other networks for interconnecting clients, servers and other devices.

As depicted, one of the imaging devices 101 may be connected to one of the clients 102, one of the servers 104, the hub 114 of the LAN 112, or directly to one of the providers 108, and may include suitable hardware and software for connecting to the internetwork 110 through any of the above devices or systems. One of the imaging devices 101 that may be used in the systems herein is a high-resolution color video camera, such as an Olympus OLY-750 coupled to a Coreco, Occulus data acquisition board. This imaging device 101 may be used to gather images for the image database, as described in more detail below. Another one of the imaging devices 101 may be a robotic microscope, such as an Olympus AX70, allowing electronic control over a specimen stage, a light level, an objective lens, and a focus, as well as parameters of digitization such as rate and resolution. The imaging devices 101 may be steered to an x-position and a y-position of a specimen through electronic control. One of the imaging devices 101 may be used to obtain a query image. More generally, the term 'imaging device' as used herein should be understood to include cameras, microscopes, or any other device for capturing and/or providing an image in electronic form, and should further be understood to include to include a mass storage device or other device for providing a previously captured electronic image.

In the systems described herein, the imaging devices 101 are used to obtain images of tissue microarrays. A tissue microarray may be a block of paraffin or similar material having holes placed therein to receive tissue samples. The samples placed in the tissue microarray are typically placed in some regular pattern, such as a rectangular matrix of cores, possibly with rows and/or columns skipped at regular intervals to facilitate visual navigation of the array. In such an embodiment, each core has an x-coordinate and a y-coordinate at or near the center of the core, which may be identified and used to locate the core as described below. Other regular or irregular patterns may also, or instead be used, provided each core can be located and revisited within the array. It will be appreciated that, while disks are a common geometry used for samples in a tissue microarray, other geometries are possible, including regular and irregular geometric profiles, and may be used with the system described herein, provided they are amenable to punching of matching shapes in a tissue source (for taking samples) and the receiving material (e.g., paraffin). The terms 'disk' or 'core', as used herein, are intended to include any such geometry. The terms 'specimen' or 'biological specimen' are intended to refer to any biological (or inert control) material that may be sampled and inserted into a tissue microarray.

An exemplary client 102 includes the conventional components of a client system, such as a processor, a memory (e.g. RAM), a bus which couples the processor and the memory, a mass storage device (e.g. a magnetic hard disk or an optical storage disk) coupled to the processor and the memory through an I/O controller, and a network interface coupled to the processor and the memory, such as modem, digital subscriber line ("DSL") card, cable modem, network interface card, wireless network card, or other interface device capable of wired, fiber optic, or wireless data communications. One example of such a client 102 is a personal computer equipped with an operating system such as Microsoft Windows 2000, Microsoft Windows NT, Unix, Linux, and Linux variants, along with software support for Internet communication protocols. The personal computer may also include a browser program, such as Microsoft Internet Explorer or Netscape Navigator, to provide a user interface for access to the Internet 110. Although the personal computer is a typical client 102, the client 102 may also be a workstation, mobile computer, Web phone, television set-top box, interactive kiosk, personal digital assistant, or other device capable of communicating over the Internet 110. As used herein, the term "client" is intended to refer to any of the above-described clients 102, as well as proprietary network clients designed specifically for the systems described herein, and the term "browser" is intended to refer to any of the above browser programs or other software or firmware providing a user interface for navigating the Internet 110 and/or communicating with the medical image processing systems.

An exemplary server 104 includes a processor, a memory (e.g. RAM), a bus which couples the processor and the memory, a mass storage device (e.g. a magnetic or optical disk) coupled to the processor and the memory through an I/O controller, and a network interface coupled to the processor and the memory. Servers may be organized as layers of clusters in order to handle more client traffic, and may include separate servers for different functions such as a database server, a file server, an application server, and a Web presentation server. Such servers may further include one or more mass storage devices such as a disk farm or a redundant array of independent disk ("RAID") system for additional storage and data integrity. Read-only devices, such as compact disc drives and digital versatile disc drives, may also be connected to the servers. Suitable servers and mass storage devices are manufactured by, for example, Compaq, IBM, and Sun Microsystems. As used herein, the term "server" is intended to refer to any of the above-described servers 104.

Focusing now on the internetwork 110, one embodiment is the Internet. The structure of the Internet 110 is well known to those of ordinary skill in the art and includes a network backbone with networks branching from the backbone. These branches, in turn, have networks branching from them, and so on. The backbone and branches are connected by routers, bridges, switches, and other switching elements that operate to direct data through the internetwork 110. However, one may practice the present invention on a wide variety of communication networks. For example, the internetwork 110 can include interactive television networks, telephone networks, wireless data transmission systems, two-way cable systems, customized computer networks, interactive kiosk networks, or ad hoc packet relay networks.

One embodiment of the internetwork 110 includes Internet service providers 108 offering dial-in service, such as Microsoft Network, America OnLine, Prodigy and CompuServe. It will be appreciated that the Internet service providers 108 may also include any computer system which can provide Internet access to a client 102. Of course, the Internet service providers 108 are optional, and in some cases, the clients 102 may have direct access to the Internet 110 through a dedicated DSL service, ISDN leased lines, T1 lines, digital satellite service, cable modem service, or any other high-speed connection to a network point-of-presence.

Any of these high-speed services may also be offered through one of the Internet service providers 108.

In its present deployment as the Internet, the internetwork 110 consists of a worldwide computer network that communicates using protocols such as the well-defined Transmission Control Protocol ("TCP") and Internet Protocol ("IP") to provide transport and network services. Computer systems that are directly connected to the Internet 110 each have a unique IP address. The IP address consists of four one-byte numbers (although a planned expansion to sixteen bytes is underway with IPv6). The four bytes of the IP address are commonly written out separated by periods such as "xxx.xxx.xxx.xxx". To simplify Internet addressing, the Domain Name System ("DNS") was created. The DNS allows users to access Internet resources with a simpler alphanumeric naming system. A DNS name consists of a series of alphanumeric names separated by periods. For example, the name "www.umdnj.edu" corresponds to a particular IP address. When a domain name is used, the computer accesses a DNS server to obtain the explicit four-byte IP address. It will be appreciated that other internetworks 110 may be used with the invention. For example, the internetwork 110 may be a wide-area network, a local-area network, or corporate-area network.

To further define the resources on the Internet 110, the Uniform Resource Locator system was created. A Uniform Resource Locator ("URL") is a descriptor that specifically defines a type of Internet resource along with its location. URLs have the following format:

resource-type://domain.address/path-name where resource-type defines the type of Internet resource. Web documents are identified by the resource type "http" which indicates that the hypertext transfer protocol should be used to access the document. Other common resource types include "ftp" (file transmission protocol), "mailto" (send electronic mail), "file" (local file), and "telnet." The domain.address defines the domain name address of the computer that the resource is located on. Finally, the path-name defines a directory path within the file system of the server that identifies the resource. As used herein, the term "IP address" is intended to refer to the four-byte Internet Protocol address (or the sixteen-byte IPv6 address), and the term "Web address" is intended to refer to a domain name address, along with any resource identifier and path name appropriate to identify a particular Web resource. The term "address," when used alone, is intended to refer to either a Web address or an IP address.

In an exemplary embodiment, a browser, executing on one of the clients 102, retrieves a Web document at an address from one of the servers 104 via the internetwork 110, and displays the Web document on a viewing device, e.g., a screen. A user can retrieve and view the Web document by entering, or selecting a link to, a URL in the browser. The browser then sends an http request to the server 104 that has the Web document associated with the URL. The server 104 responds to the http request by sending the requested Web document to the client 102. The Web document is an http object that includes plain text, or ASCII, conforming to the HyperText Markup Language ("HTML"). Other markup languages are known and may be used on appropriately enabled browsers and servers, including the Dynamic HyperText Markup Language ("DHTML"), the Extensible Mark-up Language ("XML"), the Extensible Hypertext Markup Language ("XHTML"), and the Standard Generalized Markup Language ("SGML").

Each Web document may contain hyperlinks to other Web documents. The browser displays the Web document on the screen for the user and the hyperlinks to other Web documents are emphasized in some fashion such that the user can identify and select each hyperlink. To enhance functionality, a server 104 may execute programs associated with Web documents using programming or scripting languages, such as Perl, C, C++, or Java. A server 104 may also use server-side scripting languages such as ColdFusion from Allaire, Inc., or PHP. These programs and languages perform "back-end" functions such as transaction processing, database management, content searching, and implementation of application logic for applications. A Web document may also include references to small client-side applications, or applets, that are transferred from the server 104 to the client 102 along with a Web document and executed locally by the client 102. Java is one popular example of a programming language used for applets. The text within a Web document may further include (non-displayed) scripts that are executable by an appropriately enabled browser, using a scripting language such as JavaScript or Visual Basic Script. Browsers may further be enhanced with a variety of helper applications to interpret various media including still image formats such as JPEG and GIF, document formats such as PS and PDF, motion picture formats such as AVI and MPEG, and sound formats such as MP3 and MIDI. These media formats, along with a growing variety of proprietary media formats, may be used to enrich a user's interactive and audio-visual experience as each Web document is presented through the browser. The term "page" as used herein is intended to refer to the Web document described above, as well as any of the above-described functional or multimedia content associated with the Web document.

Figure 2:
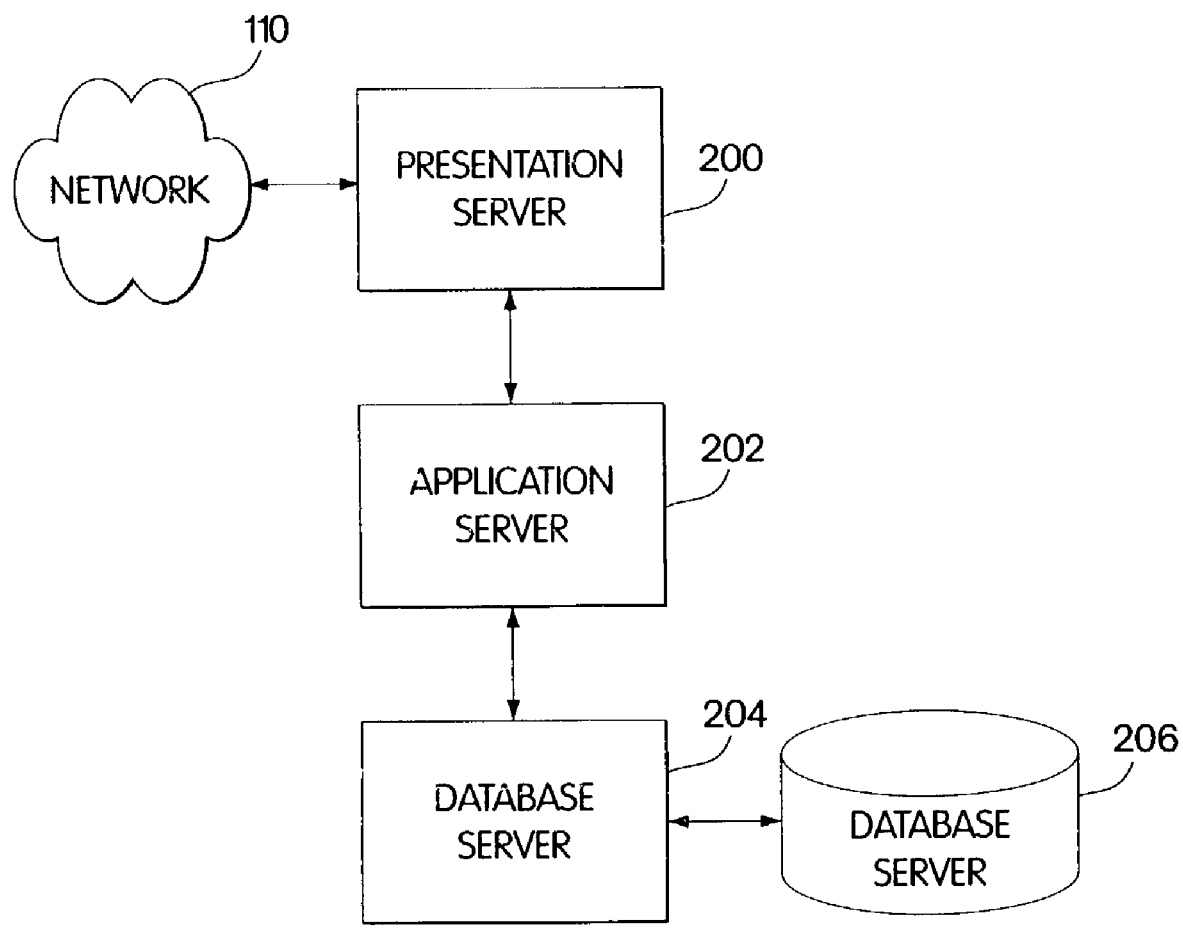
FIG. 2 shows a block diagram of a server that may be used with the systems described herein.

FIG. 2 shows a block diagram of a server that may be used with the systems described herein. In this embodiment, the server 104 includes a presentation server 200, an application server 202, and a database server 204. The application server 202 is connected to the presentation server 200. The database server 204 is also connected to the presentation server 200 and the application server 202, and is further connected to a database 206 embodied on a mass storage device. The presentation server 200 includes a connection to the internetwork 110. It will be appreciated that each of the servers may comprise more than one physical server, as required for capacity and redundancy, and it will be further appreciated that in some embodiments more than one of the above servers may be logical servers residing on the same physical device. One or more of the servers may be at a remote location, and may communicate with the presentation server 200 through a local area or wide area network. The term "host," as used herein, is intended to refer to any combination of servers described above that include a presentation server 200 for providing access to pages by the clients 102. The term "site," as used herein, is intended to refer to a collection of pages sharing a common domain name address, or dynamically generated by a common host, or accessible through a common host (i.e., a particular page may be maintained on or generated by a second, remote or local server, but nonetheless be within a 'site').

The presentation server 200 provides an interface for one or more connections to the internetwork 110, thus permitting more than one of the clients 102 (FIG. 1) to access the site at the same time. In one embodiment, the presentation server 200 comprises a plurality of enterprise servers, such as the ProLiant Cluster available from Compaq Computer Corp., or a cluster of E250's from Sun MicroSystems running Solaris 2.7. Other suitable servers are known in the art and are and may be adapted to use with the systems described herein, such as, for example, an iPlanet Enterprise Server 4.0 from the Sun/Netscape Alliance. The presentation server 200 may also use, for example, Microsoft's .NET technology, or use a Microsoft Windows operating system, with a "front end" written in Microsoft Active Server Page ("ASP"), or some other programming language or server software capable of integrating ActiveX controls, forms, Visual Basic Scripts, JavaScript, Macromedia Flash Technology multimedia, e-mail, and other functional and multimedia aspects of a page. Typically, the front end includes all text, graphics, and interactive objects within a page, along with templates used for dynamic page creation. The presentation server 200 maintains one or more connections to the Internet 110. Where there is substantial network traffic, the connections are preferably provided by a tier one provider, i.e., one of the dozen or so national/international Internet backbones with cross-national links of T3 speeds or higher, such as MCI, UUNet, BBN Planet, and Digex.

A client 102 (FIG. 1) accessing an address hosted by the presentation server 200 will receive a page from the presentation server 200 containing text, forms, scripts, active objects, hyperlinks, etc., which may be collectively viewed using a browser. Each page may consist of static content, i.e., an HTML text file and associated objects (*.avi, *.jpg, *.gif, etc.) stored on the presentation server, and may include active content including applets, scripts, and objects such as check boxes, drop-down lists, and the like. A page may be dynamically created in response to a particular client 102 request, including appropriate queries to the database server 204 for particular types of data to be included in a responsive page. It will be appreciated that accessing a Web page is more complex in practice, and includes, for example, a DNS request from the client 102 to a DNS server, receipt of an IP address by the client 102, formation of a TCP connection with a port at the indicated IP address, transmission of a GET command to the presentation server 200, dynamic page generation (if required), transmission of an HTML object, fetching additional objects referenced by the HTML object, and so forth.

The application server 202 provides the "back-end" functionality of the Web site, and includes connections to the presentation server 200 and the database server 204. In one embodiment, the presentation server 200 comprises an enterprise server, such as one available from Compaq Computer Corp., running the Microsoft Windows NT operating system, or a cluster of E250's from Sun MicroSystems running Solaris 2.7. The back-end software may be implemented using pre-configured e-commerce software, such as that available from Pandesic, to provide back-end functionality including transaction processing, billing, data management, financial transactions, order fulfillment, and the like. The application server 202 may include a software interface to the database server 204, as well as a software interface to the front end provided by the presentation server 200. The application server 200 may also use a Sun/Netscape Alliance Server 4.0.

The database server 204 may be an enterprise server, such as one available from Compaq Computer Corp., running the Microsoft Windows NT operating system or a cluster of E250's from Sun MicroSystems running Solaris 2.7, along with software components for database management. Suitable databases are provided by, for example, Oracle, Sybase, and Informix. The database server 204 may also include one or more databases 206, typically embodied in a mass-storage device. The databases 206 may include, for example, user interfaces, search results, search query structures, lexicons, user information, and the templates used by the presentation server to dynamically generate pages. It will be appreciated that the databases 206 may also include structured or unstructured data, as well as storage space, for use by the presentation server 200 and the application server 202. In operation, the database management software running on the database server 204 receives properly formatted requests from the presentation server 200, or the application server 202. In response, the database management software reads data from, or writes data to, the databases 206, and generates responsive messages to the requesting server. The database server 204 may also include a File Transfer Protocol ("FTP") or a Secure Shell ("SSH") server for providing downloadable files.

While the three tier architecture described above is one conventional architecture that may be used with the systems described herein, it will be appreciated that other architectures for providing data and processing through a network are known and may be used in addition to, or in conjunction with, or in place of the described architecture. Any such system may be used, provided that it can support aspects of the image processing system described herein.

Figure 3:
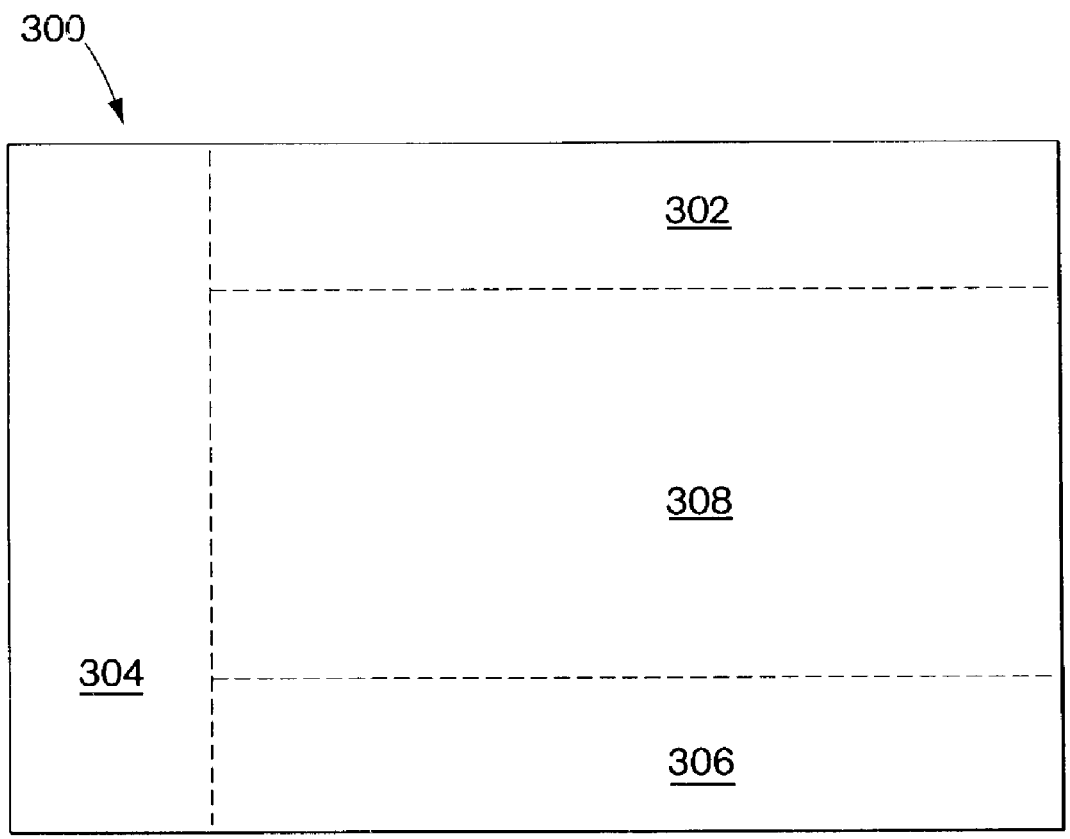
FIG. 3 shows a page that may be used as a user interface.

FIG. 3 shows a page that may be used as a user interface. The page 300 may include a header 302, a sidebar 304, a footer 306 and a main section 308, all of which may be displayed at a client 102 using a browser. The header 302 may include, for example, one or more banner advertisements and a title of the page. The sidebar 304 may include a menu of choices for a user at the client 102. The footer 306 may include another banner advertisement, and/or information concerning the site such as a "help" or "webmaster" contact, copyright information, disclaimers, a privacy statement, etc. The main section 308 may include content for viewing by the user. The main section 308 may also include, for example, tools for electronically mailing the page to an electronic mail ("e-mail") account, searching content at the site, and so forth. It will be appreciated that the description above is generic, and may be varied according to where a client 102 is within a Web site related to the page, as well as according to any available information about the client 102 (such as display size, media capabilities, etc.) or the user.

A Web site including the page 300 may use cookies to track users and user information. In particular, a client 102 accessing the site may be accessed to detect whether the client 102 has previously accessed the page or the site. If the client 102 has accessed the site, then some predetermined content may be presented to the client 102. If the client 102 does not include a cookie indicating that the client 102 has visited the site, then the client 102 may be directed to a registration page where information may be gathered to create a user profile. The client 102 may also be presented with a login page, so that a pre-existing user on a new client 102 may nonetheless bypass the registration page.

The site may provide other functionality to the client 102. For example, the site may provide a search tool by which the client 102 may search for content within the site, or content external to the site but accessible through the internetwork 110. As another example, the site may display local or remote news items and stories that are topical to the site. The site may provide an interface for structured queries to, browsing of, and review of images and data in, the database that stores archived tissue microarrays. Tools may also be provided for other network functions associated with the system, such as remotely initiating data capture for a tissue microarray, manual control of a robotic microscope or other imaging device used to obtain tissue microarray images, or manual control of an imaging device.

The interface may be embodied in any software and/or hardware client operating on a client device, including a browser along with any suitable plug-ins, a Java applet, a Java application, a C or C++ application, or any other application or group of applications operating on a client device. In one embodiment, the user interface may be deployed through a Web browser. In one embodiment, the user interface may be deployed as an application running on a client device, with suitable software and/or hardware for access to an internetwork. In these and other embodiments, certain image processing functions, as well as database storage and management functions, may be distributed in any suitable manner between a client device, one or more imaging devices, and one or more servers.

It will be appreciated that a number of enhancements may be provided to the user interface. For example, voice-activated commands may be provided. Voice communication between the user and computer may enable a user to navigate among digital archives of tissue microarrays or to direct the inspection of disk specimens, or "cores", while they are viewed with the robotic microscope. Valid voice commands may include, for example, "next core", "current core", "previous core", and "where am I?". The user can also direct the scope to move to a specific core location by indicating its row and column. For quality control purposes the system may support programmed screening of samples, in which each core in an array is retrieved and displayed to the user. Browsing through cores may also be permitted, such as with a raster or snake pattern through the tissue microarray. A random mode may also be provided, in which the system randomly presents cores to user.

Figure 4:
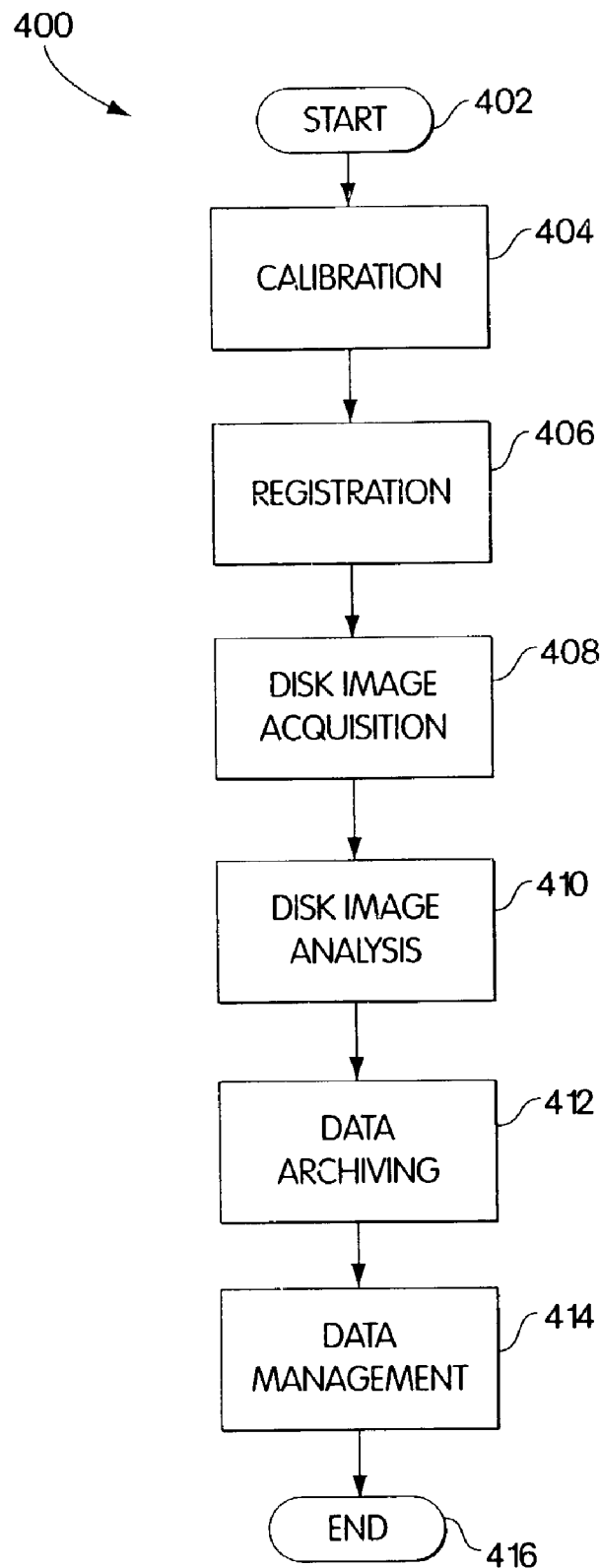
FIG. 4 is a flow chart of a process for capturing, processing, and storing images of disks in a tissue microarray.

FIG. 4 is a flow chart of a process for capturing, processing, and storing images of disks in a tissue microarray. It will be appreciated that, while disks are a common geometry used for tissue microarrays, other geometries are possible, including regular and irregular geometric profiles, and may be used with the system described herein, provided they are amenable to punching of matching shapes in a tissue source (for taking samples) and a block of paraffin or similar material (for receiving the samples). The terms 'disk' or 'core', as used herein, are intended to include any such geometry. The terms 'specimen' or 'biological specimen' are intended to refer to any biological (or inert control) material that may be sampled and inserted into a tissue microarray.

The process 400 may be realized in hardware, software, or some combination of these. The process 400 may be realized in one or more microprocessors, microcontrollers, embedded microcontrollers, programmable digital signal processors or other programmable device, along with internal and/or external memory such as read-only memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, and program output or other intermediate or final results. The process 400 may also, or instead, include an application specific integrated circuit, a programmable gate array, programmable array logic, or any other device that may be configured to process electronic signals.

Any combination of the above circuits and components, whether packaged discretely, as a chip, as a chipset, or as a die, may be suitably adapted to use with the systems described herein. It will further be appreciated that the below process 400 may be realized as computer executable code created using a structured programming language such as C, an object-oriented programming language such as C++ or Java, or any other high-level or low-level programming language that may be compiled or interpreted to run on one of the above devices, as well as heterogeneous combinations of processors, processor architectures, or combinations of different hardware and software. The process 400 may be deployed using software technologies or development environments including a mix of software languages, such as Microsoft IIS, Active Server Pages, Java, C++, Oracle databases, SQL, and so forth.

The process 400 starts 402 with a calibration of the tissue microarray image, as shown in step 404. A user interface may be provided to assist with the calibration, which may depend on the particular specimen under study and the particular microscope being used. For example, color may be calibrated to accommodate measurement of protein expression for a full spectrum of stains and biologic targets (e.g. stromal, epithelial cells). In this example, the system may perform a mapping of one or more red, green, and blue intensity values of an imaged microarray into L*U*V* color space and then, using polar coordinates, plot the mapped values into an graphical window equipped with interactive controls while a crude multidimensional segmentation of the digitized microarray is performed. Using the graphical controls a user may interactively refine the segmentation by sketching lines of demarcation between clusters within the polar plot while a continuously updated output image shows the effect of utilizing the new parameters. Once the user is satisfied with the segmentation for one disk, the calibration may be applied to the remaining disks on the microarray. These and other known calibration techniques may be used to normalize image data across a number of different tissue microarrays.

Once the system is calibrated, the disks in the tissue microarray may be registered, as shown in step 406. The rows and columns of disks in the microarray are rarely straight, and slight distortions to each disk are typically introduced during specimen preparation. To account for this, the system may register each disk to ensure accurate stage localization. Slight errors in lens co-focal and co-centering may be compensated for using empirical data. An entropy-based, fast auto-focusing algorithm may be applied to ensure image quality. The tissue microarray may be, for example, scanned at a magnification of 1.25×. Scanned images may be further scaled down and joined into a map image of the entire tissue microarray. Given the approximate core diameter (a known parameter for the tissue microarray), the system may automatically generates a disk template, which is approximately the same size as the disks in the mapped image. A template matching protocol is implemented to identify disks based upon one or more visual features of the disks. This matching to visual features may be accomplished by first convolving the map image with the template, using a two-dimensional, discrete convolution, and then performing a top-hat peak-detection for disk centers. The template for the convolution is preferably a circular template based upon the known, approximate core diameter. More specifically, the template is preferably a circle filed with a unit value (e.g., one) for each pixel within the circle, and a circumferential border of negative unit values (e.g., −1). The convolution is preferably accomplished through a multiplication of a two-dimensional, discrete transform of the template with a two-dimensional, discrete transform of the scanned image. The result, after peak detection, is the coordinates of all candidate cores.

As noted above, some deformation of the tissue microarray is expected. To address this issue, rows and columns of candidate cores may be located using a modified Hough transformation algorithm. The Hough transformation may be used to obtain gridlines connecting the cores that have been located into the rows and columns of the (approximately) rectangular array described above. The resulting gridlines may be used to recover positions of the cores that do not include visual features of the matching template. More specifically, grid intersections for which no disk was located using the matched filter above may nonetheless be identified as cores, with an image of each such core captured using the known core diameter of cores in the tissue microarray. This approach may recover, for example, one or more cores that are not positively stained in the array. By locating these cores with grid intersections, accurate stage coordinates of all cores may thus be recorded for automatic image acquisition or assisted conventional microscopic browsing. Other techniques for locating shapes are known, and may be usefully employed with the systems and methods described herein. However, the above described approach has empirically proven well-suited to use with disks in a tissue microarray. It will be appreciated that modifications will be appropriate for other arrays that are not arranged into a rectangular matrix of samples having regular rows and columns.

Once disks have been located, the process 400 may commence disk image acquisition, as shown in step 408. Using the location data obtained above, the imaging device may be automatically directed to acquire an image of each disk at a higher magnification. The process 400 may auto-focus and background-correct each disk when the image is captured. Auto-focusing may be, for example, through entropy minimization. In order to enhance image detail, the imaging device may capture images of subsections of a disk at higher magnification, which may then be combined to form a single, high-detail image.

After each disk image has been acquired, the images may be analyzed, as shown in step 410. This may be any quantitative or other objective analysis that may be realized in computer software. The images may be processed, for example, into their constituent visual components (e.g. Stromal, epithelial cell regions). The system may then produce measures to determine the signal strength for protein expression (intensity) per unit area and also in terms of integrated density of protein expression. Additionally, measures for multi-resolution texture and morphometric measurements may be generated, as well as any other useful quantitative measure that may be derived from the images, including measures of shape, size, color, color gradient, contrast, and so forth.

As shown in step 412, images and image data, such as image location and the quantitative evaluations discussed above, may be archived. This may be performed automatically, with images and associated data being stored in one or more local and/or distributed relational databases. The commercially available Oracle 8i database system is one database suitable for use with the number and size of records typically encountered in the images contemplated herein. It will be appreciated that each of the steps of disk image acquisition 408, disk analysis 410, and data archiving 412 may be performed in parallel for all disks on a tissue microarray, for groups of disks such as rows, or individually for each disk, and repeated as appropriate until all disks on the tissue microarray are processed. The order in which disks are processed may depend on memory and processing constraints of the system employed, or upon programming convenience. In one embodiment, each disk is processed individually and fed to a database before the next disk in the tissue microarray is analyzed.

Once data has been archived in step 412, data may be managed, as shown in step 414. It will be appreciated that this step may be performed immediately upon completion of step 412, or at some subsequent time at a user's convenience. The system may allow a user to design the data format for new tissue microarrays with options for labeling the disks individually or in groups. The interface may also allow for color coding of the elements (disks) from each subset and for arranging cases. Disk images, and the associated data (such as image metrics and protein expression levels) may also be managed across a number of tissue microarrays and cohorts. Thus new, virtual tissue microarrays may be created from disparate sets of archived data, thereby facilitating the design of new experiments from ensembles of existing cases.

As shown in step 416, the process 400 may end, with a structured database of results available for review by clinicians and/or researchers at local or remote locations.

It will be appreciated that the above process is merely illustrative, and that other steps and procedures, or system features, may be usefully deployed with a system as described herein, in addition to, or instead of, those disclosed herein. For example, missing disks may be located through direct inspection of the convolution results, and in certain circumstances, calibration may be omitted.

In one embodiment, the steps of the process 400 are performed by a computer locally connected to a robotic microscope. In another embodiment, the steps of the process 400 are performed by a computer that communicates with the robotic microscope through an internetwork. In either embodiment, access to the image archives may be provided to remote clients through the internetwork. A voice-activated user interface may be provided to simplify computer control over the archiving process, or over review of archived data.

Thus, while the invention has been disclosed in connection with the preferred embodiments shown and described in detail, various modifications and improvements thereon will become readily apparent to those skilled in the art. It should be understood that all matter contained in the above description or shown in the accompanying drawings shall be interpreted as illustrative, and not in a limiting sense, and that the following claims should be interpreted in the broadest sense allowable by law.

What is claimed is:

1. A method comprising the steps of:
   capturing an image of a tissue microarray at a first magnification, the tissue microarray including a plurality of disks, each disk including a sample of a biological specimen;
   locating a first group of disks from the plurality of disks using one or more visual features of the first group of disks, the locating comprising:
   generating a disk template that is substantially the same size as the disks in the captured image;
   matching the template to the said one or more visual features of said first group of disks; and
   determining the coordinates of candidate disk cores;
   identifying a grid defined by the first group of disks by locating rows and columns connecting said candidate disk cores;
   locating a second group of disks from the plurality of disks using grid intersections in the identified grid to locate disks which were not located using said template and at positions that do not include the one or more visual features of the first group of disks;

capturing an image of each one of the first group of disks and the second group of disks at a second magnification; and storing the captured images.

2. The method of claim 1 wherein identifying a grid comprises applying a Hough transformation to locate one or more gridlines having one or more intersections.

3. The method of claim 2 wherein locating a second group of disks comprises selecting locations at the one or more intersections which do not include any of the first group of disks.

4. The method of claim 1 wherein locating the first group of disks comprises convolving the image of the tissue microarray with a disk template that includes the one or more visual features.

5. The method of claim 1 further comprising quantitatively analyzing the captured images of each one of the first group of disks and the second group of disks to obtain quantitative data.

6. The method of claim 5 further comprising storing the location and the quantitative data for each one of the first group of disks and the second group of disks in a database.

7. The method of claim 6 further comprising providing access to the database over a network to one or more remote clients.

8. The method of claim 1 wherein capturing the image of the tissue microarray at the first magnification further comprises combining a plurality of images of a plurality of portions of the tissue microarray.

9. The method of claim 1 wherein a robotic microscope is employed to capture the image of the tissue microarray and to capture the image of each one of the first group of disks and the second group of disks.

10. The method of claim 9 wherein the robotic microscope is accessible over a network.

11. The method of claim 1 wherein the method is performed by a robotic microscope under control of a computer program without user intervention to autonomously capture and archive magnified images of each disk in the tissue microarray.

12. The method of claim 11 further comprising autonomously analyzing each captured image and storing a result of each autonomous analysis.

13. The method of claim 1 wherein the one or more visual features include matching to a disk template.

14. A computer readable medium coded with machine-executable instructions for causing a data processing apparatus to perform a method comprising the steps of:

controlling an imaging device to capture an image of a tissue microarray at a first magnification, the tissue microarray including a plurality of disks, each disk including a sample of a biological specimen;

locating a first group of disks from the plurality of disks using one or more visual features of the first group of disks, the locating comprising:

generating a disk template that is substantially the same size as the disks in the captured image;

matching the template to the said one or more visual features of said first group of disks; and determining the coordinates of candidate disk cores;

identifying a grid defined by the first group of disks by locating rows and columns connecting said candidate disk cores;

locating a second group of disks from the plurality of disks using grid intersections in the identified grid to locate disks which were not located using said template and at positions that do not include the one or more visual features of the first group of disks;

controlling the imaging device to capture an image of each one of the first group of disks and the second group of disks at a second magnification; and storing the captured images.

15. The computer readable medium of claim 14 wherein in said method said step of identifying a grid comprises applying a Hough transformation to locate one or more gridlines having one or more intersections.

16. The computer readable medium of claim 15 wherein in said method said step of locating a second group of disks comprises selecting locations at the one or more intersections which do not include any of the first group of disks.

17. The computer readable medium of claim 14 wherein in said method said step of locating the first group of disks comprises convolving the image of the tissue microarray with a disk template that includes the one or more visual features.

18. The computer readable medium of claim 14 wherein said method further comprises quantitatively analyzing the captured images of each one of the first group of disks and the second group of disks to obtain quantitative data.

19. The computer readable medium of claim 18 wherein said method further comprises storing the location and the quantitative data for each one of the first group of disks and the second group of disks in a database.

20. The computer readable medium of claim 14 wherein in said method the imaging device is a robotic microscope.

21. A system comprising:

capturing means for capturing an image of a tissue microarray at a first magnification, the tissue microarray including a plurality of disks, each disk including a sample of a biological specimen;

first locating means for locating a first group of disks from the plurality of disks using one or more visual features of the first group of disks, the first locating means comprising:

means for generating a disk template that is substantially the same size as the disks in the captured image;

means for matching the template to the said one or more visual features of said first group of disks; and means for determining the coordinates of candidate disk cores;

identifying means for identifying a grid defined by the first group of disks by locating rows and columns connecting said candidate disk cores;

second locating means for locating a second group of disks from the plurality of disks using grid intersections in the identified grid to locate disks which were not located using said template and at positions that do not include the one or more visual features of the first group of disks;

the capturing means further for capturing an image of each one of the first group of disks and the second group of disks at a second magnification; and storing means for storing the captured images.

22. A system comprising an imaging device and a computer, the imaging device responsive to control signals to provide images at a specified magnification and a specified location within a tissue microarray, and the computer providing the control signals to the imaging device and receiving the images provided by the imaging device, the computer being configured to locate a first group of disks from the plurality of disks using one or more visual features of the first group of disks on the tissue microarray within an image of the tissue microarray captured at a first magnification, the locating configuration comprising:

generating a disk template that is substantially the same size as the disks in the captured image;

matching the template to the said one or more visual features of said first group of disks; and determining the coordinates of candidate disk cores;

the computer being configured to identify a grid defined by the first group of disks by locating rows and columns connecting said candidate disk cores;

and the computer being further configured to locate a second group of disks on the tissue microarray using grid intersections in the identified grid to locate disks which were not located using said template and at positions that do not include the one or more visual feaures of the first group of disks.

23. The system of claim 22 wherein the computer communicates with the imaging device through a local area network.

24. The system of claim 22 wherein the computer communicates with the imaging device through an internetwork.

25. The system of claim 22 wherein the computer includes a voice-activated command system for receiving and processing user input.

26. The system of claim 22 further comprising a database for storing, for each disk of the first group of disks and the second group of disks, an image of the disk, a location of the disk, and a quantitative analysis of the disk.

27. The system of claim 26 wherein the database is accessible from one or more remote computers through an internetwork.

28. The method of claim 1 wherein said one or more visual features comprises one or more visual shape features.

* * * * *